United States Patent
Garoff et al.

(10) Patent No.: US 6,849,700 B1
(45) Date of Patent: Feb. 1, 2005

(54) CATALYST COMPONENT COMPRISING MAGNESIUM, TITANIUM, A HALOGEN AND AN ELECTRON DONOR, ITS PREPARATION AND USE

(75) Inventors: Thomas Garoff, Helsinki (FI); Timo Leinonen, Tolkkinen (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/959,537

(22) PCT Filed: May 9, 2000

(86) PCT No.: PCT/FI00/00409

§ 371 (c)(1),
(2), (4) Date: Jan. 31, 2002

(87) PCT Pub. No.: WO00/68277

PCT Pub. Date: Nov. 16, 2000

(30) Foreign Application Priority Data

May 10, 1999 (FI) .................................................. 991069

(51) Int. Cl.$^7$ .................................................. C08F 4/52
(52) U.S. Cl. .................... 526/151; 526/148; 526/137; 526/138; 502/127; 502/114; 502/115
(58) Field of Search ............................... 502/104, 114, 502/115, 128; 526/159, 123.1, 151

(56) References Cited

U.S. PATENT DOCUMENTS

| | | | | |
|---|---|---|---|---|
| 4,565,798 A | * | 1/1986 | Yamamoto et al. | 502/119 |
| 4,588,793 A | * | 5/1986 | Imai et al. | 526/124 |
| 4,711,939 A | * | 12/1987 | Imai et al. | 526/124 |
| 4,988,656 A | | 1/1991 | Arzoumanidis et al. | |
| 5,710,229 A | * | 1/1998 | Garoff et al. | 526/348 |
| 5,767,215 A | * | 6/1998 | Garoff et al. | 526/348 |
| 5,945,366 A | * | 8/1999 | Kataoka et al. | 502/127 |
| 6,156,690 A | * | 12/2000 | Hosaka et al. | 502/118 |
| 6,207,607 B1 | * | 3/2001 | Garoff et al. | 502/127 |
| 6,303,532 B1 | * | 10/2001 | Garoff et al. | 502/127 |
| 6,420,499 B1 | * | 7/2002 | Garoff et al. | 526/123.1 |
| 2001/0008869 A1 | * | 7/2001 | Garoff et al. | 502/104 |

FOREIGN PATENT DOCUMENTS

| | | | | |
|---|---|---|---|---|
| EP | 0 195 497 A2 | * | 1/1986 | ............. C08F/4/64 |
| EP | 0 173 472 | | 3/1986 | |
| EP | 0 288 762 A2 | * | 11/1988 | ........... C08F/10/06 |
| EP | 0 743 326 A1 | * | 5/1996 | ........... C08F/10/00 |
| EP | 0 926 165 | | 6/1999 | |
| WO | 97/36938 | | 10/1997 | |
| WO | 97/36939 | | 10/1997 | |

* cited by examiner

*Primary Examiner*—Rip A. Lee
(74) *Attorney, Agent, or Firm*—Birch, Stewart, Kolasch & Birch, LLP

(57) ABSTRACT

The invention relates to a process for the preparation of an olefin polymerisation catalyst component, said catalyst component and its use. The process is mainly characterized by the steps of (i) reacting in solution a magnesium compound containing an alkoxy group, a carboxylic acid halide and a four-valent titanium compound containing a halogen, for obtaining a dissolved reaction product and (ii) recovering a fraction of the reaction product from step (i) in particulate form by contacting the dissolved reaction product with a mixture of an aromatic and an aliphatic hydrocarbon, or by contacting the dissolved reaction product first with an aromatic hydrocarbon and then with an aliphatic hydrocarbon, the amount of aromatic and aliphatic hydrocarbon being at least 5 mol per mol of magnesium.

52 Claims, No Drawings

CATALYST COMPONENT COMPRISING MAGNESIUM, TITANIUM, A HALOGEN AND AN ELECTRON DONOR, ITS PREPARATION AND USE

This application is the national phase under 35 U.S.C. § 371 of PCT International Application No. PCT/FI00/00409 which has an International filing date of May 9, 2000, which designated the United States of America and was published in English.

The invention relates to a process for the preparation of a particulate olefin polymerization catalyst component comprising a magnesium dihalide, a titanium tetrahalide and a carboxylic acid ester. The invention also relates to such a catalyst component and its use for the polymerisation of olefins.

BACKGROUND OF THE INVENTION

The process for the preparation of a particulate olefin polymer catalyst component as described in the applicant's patent applications FI 981717 and FI 981718 which were not public when present application was filed, includes a step in which a fraction of a magnesium dihalide-titanium tetrahalide-carboxylic acid ester complex is recovered by precipitation from solution. This precipitation is traditionally made by contacting the solution with a large amount of an aliphatic hydrocarbon. However, such precipitation leads to a tar-like reaction product of low catalytic activity, that need to be washed several times in order to decrease the amount of unactive titanium complex. Such washing leads to a further decreased activity of the catalyst.

Aromatic hydrocarbons have also been used for the precipitation, but they lead to a very finely divided precipitate which is difficult to deposit.

DESCRIPTION OF THE INVENTION

The purpose of the present invention is to provide a fast process which results in a catalyst component having good activity. This has now been reached by a novel process for the preparation of a catalyst component of the above type, which is mainly characterised by the steps of (i) reacting in solution a magnesium compound containing an alkoxy group, a carboxylic acid halide and a four-valent titanium compound containing a halogen, for obtaining a dissolved reaction product and (ii) recovering a fraction of the reaction product from step (i) in particulate form by contacting the dissolved reaction product with a mixture of an aromatic and an aliphatic hydrocarbon, or by contacting the dissolved reaction product first with an aromatic hydrocarbon and then with an aliphatic hydrocarbon, the amount of aromatic and aliphatic hydrocarbon being at least 5 mol per mol of magnesium.

The components of step (i) can be added in any order, however a preferred embodiment of the invention is characterised in that in a first step of step (i), the magnesium compound containing an alkoxy group is reacted with the carboxylic acid halide in the presence of a first solvent and in a second step of step (i) the obtained product is further reacted with the four-valent titanium compound containing a halogen in the presence of a second solvent.

It has thus been found that a fast process for the preparation of a particulate olefin polymerization catalyst component having good activity and comprising a magnesium dihalide, a titanium tetrahalide and a carboxylic acid can be reached by using a mixture of an aromatic hydrocarbon and an aliphatic hydrocarbon for the recovering of a fraction of the reaction product. The fraction has an optimal composition and preferably leads to the catalyst component $(MgCl_2)_{6-12}*TiCl_4*$carboxylic acid ester which is catalytically very active.

The catalyst component recovered in step (i) is preferably obtained in solid form by precipitation. Precipitation in the present invention means that the reaction product formed in solution is recovered as a powder, the particles of which consist of similar individual molecules of that reaction product. The particles formed according to the present invention are thus homogeneous.

According to a preferable embodiment of the invention, the recovering stage is performed by contacting the dissolved reaction product of step (i) with from 5 to 5000 mol, preferably from 10 to 2000 mol, most preferably from 20 to 1000 mol per mol of magnesium of said hydrocarbon mixture.

Said hydrocarbon mixture of step (ii) is preferably a mixture of an aromatic hydrocarbon and an aliphatic hydrocarbon, which mixture preferably contains from 95 to 40%, most preferably from 90 to 50% by weight of an aromatic hydrocarbon and from 5 to 60%, most preferably from 10 to 50% by weight of an aliphatic hydrocarbon.

The aromatic hydrocarbon used in the process is preferably selected from substituted and unsubstituted benzenes, preferably from alkylated benzenes, more preferably from toluene and the xylenes, most preferably from toluene. The aliphatic hydrocarbon is preferably selected from aliphatic $C_5$–$C_{12}$-hydrocarbons, preferably from pentane, hexane, heptane and/or octane, most preferably from pentane, hexane or heptane.

According to another embodiment of the invention, the recovering of the reaction product in particulate form is performed by precipitating the dissolved reaction product with an aromatic hydrocarbon and settling the precipitate by gradually adding aliphatic hydrocarbon to the precipitated reaction mixture. This recovering is performed by contacting said dissolved reaction product with from 95 to 40%, preferably from 90 to 50% by weight of the total amount of hydrocarbons added in the recovering step (ii) of said aromatic hydrocarbon, and that said settling of the precitate is performed by adding from 5 to 60%, preferably from 10 to 50% by weight of the total amount of hydrocarbons added in the recovering step (ii) of said aliphatic hydrocarbon.

According to a preferred embodiment of the invention, the recovered fraction of the reaction product which has been obtained in particulate form is washed at least once, preferably at least twice, most preferably at least three times with a hydrocarbon, which preferably is selected from aromatic and aliphatic hydrocarbons.

It is preferable if said recovered catalyst component is washed with toluene, preferably with hot (e.g. 90° C.) toluene. It is further preferable if said recovered catalyst component is washed with heptane, most preferably with hot (e.g. 90° C.) heptane. Yet further, it is preferable if said recovered catalyst component is washed with pentane. A washing step typically includes several substeps. Such a washing sequence is, for example, one wash with toluene at 90° C., two washes with heptane at 90° C. and one or two washes with pentane at room temperature.

The washing can according to the invention be optimized to give a catalyst with novel and desirable properties. Finally, the washed catalyst component is usually dried, preferably by evaporation.

When titanium tetrachloride is used as titanium tetrahalide in step (i), the solvent in this step can be an excess of titanium tetrachloride or a mixture thereof with a hydrocarbon.

The molar ratio of said first solvent in step (i) to magnesium is preferably less than 10. According to an embodiment of the invention, the molar ratio of said solvent to magnesium is from 4 to 10, preferably from 5 to 9 and most preferably from 6 to 8.

Further, in step (i), the first solvent used is preferably an aliphatic $C_5$–$C_{12}$-hydrocarbon, preferably pentane, hexane, heptane and/or octane, most preferably pentane, hexane or heptane, which before reacting the titanium compound in a second step is replaced in the reaction mixture by an aromatic hydrocarbon. This means e.g. that the alkoxy magnesium compound may initially be reacted with the acid halide in an aliphatic hydrocarbon, after which the aliphatic hydrocarbon is replaced by an aromatic hydrocarbon before reacting further with the titanium halide.

Optionally, the first solvent is an aromatic hydrocarbon selected from substituted, unsubstituted and alkylated benzenes, preferably from alkylated benzenes, more preferably from toluene and the xylenes, most preferably from toluene, whereby the first solvent can be used as the second solvent is step (i).

The molar ratio of said second solvent to magnesium is preferably from 3 to 10, more preferably from 4 to 8 and most preferably from 5 to 7. Said second solvent is preferably an aromatic hydrocarbon, selected from substituted, unsubstituted and alkylated benzenes, preferably from alkylated benzenes, more preferably from toluene and the xylenes, most preferably from toluene.

It is preferable if the intermediates as well as the final product of the claimed process are distinct compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 1831, "a derived name of compounds of higher order, which originate from the combination of molecules,—unlike compounds of first order, in the creation of which atoms participate".

The magnesium compound containing an alkoxy group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

Typical magnesium dialkoxides are magnesium dibutoxide and magnesium dipentoxide. The preferred magnesium dihalide to be reacted is magnesium dichloride $MgCl_2$. The dialkyl magnesium to be reacted has the formula $R_2Mg$, wherein each one of the two R:s is a similar or different $C_1$–$C_{20}$ alkyl, preferably a similar or different $C_4$–$C_{10}$ alkyl. Typical magnesium alkyls are ethylbutyl magnesium, dibutyl magnesium, dipropyl magnesium, propylbutyl magnesium. dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

The dialkyl magnesium, alkyl magnesium alkoxide or magnesium dihalide is most preferably reacted with a polyhydric alcohol $R'(OH)_m$ or a mixture thereof with a monohydric alcohol R'OH. The use of a polyhydric alcohol $R'(OH)_m$ improves both the activity and the morphology of the catalyst component compared to the use of a monohydric alcohol alone.

Typical polyhydric alcohols are ethylene glycol, propylene glycol, trimethylene glycol, 1,2-butylene glycol, 1,3-butylene glycol, 1,4-butylene glycol, 2,3-butylene glycol 1,5-pentanediol, 1,6-hexanediol, 1,8-octanediol, pinacol, diethylene glycol, triethylene glycol, glycerol, trimethylol propane and pentareythritol. The polyhydric alcohol can be selected on the basis of the activity and morphology it gives the catalyst component. E.g. larger particle size and broader particle size distribution can be obtained by using ethylene glycol.

Typical $C_1$–$C_5$ monohydric alcohols are methanol, ethanol, n-propanol, iso-propanol, n-butanol, iso-butanol, sec.butanol, tert.butanol, n-amyl alcohol iso-amyl alcohol, sec.amyl alcohol tert.amyl alcohol diethyl carbinol, akt.amyl alcohol, sec.isoamyl alcohol, tert.butyl carbinol. Typical $C_6$–$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical $>C_{10}$ monohydric alcohols are n-1-undecanol, n-1-dodecanol, n-1-tri-decanol, n-1-tetradecanol, n-1-pentadecanol, 1-hexadecanol, n-1-heptadecanol and n-1-octadecanol. The monohydric alcohols may be unsaturated, as long as they do not act as catalyst poisons.

Preferable monohydric alcohols are those of formula R'OH in which R' is a $C_2$–$C_{16}$ alkyl group, most preferably a $C_4$–$C_{12}$ alkyl group, like 2-ethyl-1-hexanol.

Preferably, essentially all of the carboxylic acid ester is a reaction product of the above mentioned carboxylic acid halide. The carboxylic acid halide is preferably a dicarboxylic acid dihalide, more preferably an unsaturated (α,β-dicarboxylic acid dihalide, most preferably phthalic acid dichloride.

According to yet another embodiment of the invention, the four-valent titanium compound containing a halogen is a titanium tetrahalide $TiX''_4$, wherein X'' is a halogen. Equivalent with said titanium tetrahalide is the combination of an alkoxy titanium halide and a halogenation agent thereof, which are able to form a titanium tetrahalide in situ. However, the most preferred titanium tetrahalide is titanium tetrachloride.

The reaction conditions used in the claimed process may be varied according to the used reactants and agents.

In the invention, it was further found that the addition of at least one halogenated hydrocarbon during the process led to a further improved catalytic activity.

The halogenated hydrocarbon preferably has the formula $R'''X'''_n$ wherein R''' is an n-valent $C_1$–$C_{20}$ hydrocarbyl group, X''' is a halogen and n is an integer from 1 to 4.

Such chlorinated hydrocarbons are, e.g., monochloromethane, dichloromethane, in trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2)-tetrachloroethane, pentachloroethane, hexachloroethane, (1)-chloropropane, (2)-chloropropane, (1,2)-dichloropropane, (1,3)-dichloropropane, (1,2,3)-trichloropropane, (1)-chlorobutane, (2)-chlorobutane, isobutyl chloride, tert.butyl chloride, (1,4)-dichlorobutane, (1)-chloropentane, (1,5)-dichloropentane. The chlorinated hydrocarbons of the invention may also be unsaturated, provided that the unsaturation does not act as catalyst poison in the final catalyst component.

In said halogenated hydrocarbon having the above formula, R''' is preferably a mono-or bivalent $C_1$–$C_{10}$ alkyl group, independently, X''' is preferably chlorine and, independently, n is preferably 1 or 2. Preferably said halogenated hydrocarbyl is a butyl chloride (BuCl) or a dichloroalkane like (1,4)-dichlorobutane, more preferably tertiary butyl chloride or a dichloroalkane like (1,4)-dichlorobutane, most preferably a dichloroalkane like (1,4)-dichlorobutane.

In addition to the above described process, the invention also relates to a particulate olefin polymerization catalyst component comprising a magnesium dihalide, a titanium tetrahalide and a carboxylic acid ester as internal electron donor, which has been prepared according to the above described process.

In addition to the above described process and catalyst component, the invention also relates to a process for the polymerisation of olefins, wherein an olefin is contacted with a particulate olefin polymerization catalyst component comprising a magnesium dihalide, a titanium tetrahalide and a carboxylic acid ester as internal electron donor, and an organometallic cocatalyst, which has been prepared according to the above described process. Preferably, the organometallic cocatalyst is an alkyl aluminium chloride.

The invention is described below by means of examples, the purpose of which is merely to illustrate the invention.

toluene was added at 90° C. and the reaction mixture was heated during 10 minutes. The cold solution obtained was siphonated into a solution of 7 mol of titanium tetrachloride at 110° C.

The solution was then heated at 110° C. for 5 minutes and the reaction product was recovered by adding 72 ml of toluene and 30 ml of heptane at 90° C. and allowing it to settle for 30 minutes.

After the recovering, the reaction product was washed five times: first with 102 ml of toluene at 90° C. for 4 minutes, secondly with 98 ml of heptane at 90° C. for 2 minutes, thirdly with 122 ml of heptane at 90° C. for 2 minutes, fourthly with 126 ml of pentane at 20° C. for 2 minutes and fiftly with 105 ml of pentane at 20° C. for 2 minutes. The settling in volume of the catalyst precipitation (in ml) during the recovery and the washings are summarised in Table 1. The reaction product was dried under nitrogen flow at 60° for 45 minutes. The yield was 4.2 g.

TABLE 1

Settling of the reaction product

| Settling time (min) | Recovery Toluene/ heptane | Washings Toluene/1 | Heptane/1 | Heptane/2 | Pentane/1 | Pentane/2 |
|---|---|---|---|---|---|---|
| 0 | 150 | 140 | 137 | 147 | 144 | 122 |
| 1 | 37 | 75 | 23 | 21 | 19 | 19 |
| 2 | 34 | 40 | 19 | 18 | 17 | 17 |
| 3 | 30 | 30 | | | | |
| 4 | 28 | 28 | | | | |
| 5 | 27 | | | | | |

EXAMPLES

Preparation of the Catalyst Components

Example 1

0.25 mol of ethylene glycol was added to 0.25 mol of 2-butyl-2-ethyl-1,3-propanediol in an inert reactor at room temperature. Further, 2 mol of 2-ethyl-1-hexanol was added and the reaction mixture was rapidly heated to 60° C. to increase the dissolution and the mixture was allowed to cool to 20° C.

1 mol of 20% butyl octyl magnesium in heptane was added at room temperature and the mixture was heated at 60° C. for 30 minutes. 0,5 mol of 1,2-phtalic acid dichloride at 60° C. was added to the reaction mixture and the heating at 60° C. was continued for 30 minutes, after which 1,1 mol of butyl chloride was added at 60° C. and the reaction mixture was heated at 60° C. for 20 minutes.

After the heating, the solvent was evaporated at 105° under nitrogen flow during approximately 90 minutes. 5 mol

Example 2

The same procedure as in example 1 was used for the preparation of the magnesium complex. The cold solution obtained was siphonated into a solution of 7 mol of titanium tetrachloride at 110° C.

The solution was then heated at 110° C. for 5 minutes and the reaction product was recovered by adding 60 ml of toluene and 40 ml of heptane at 90° C. and allowing it to settle for 49 minutes.

After the recovering, the reaction product was washed five times: first with 199 ml of toluene at 90° C. for 2 minutes, secondly with 146 ml of heptane at 90° C. for 2 minutes, thirdly with 129 ml of heptane at 90° C. for 1 minute, fourthly with 126 ml of pentane at 20° C. for 1 minute and fiftly with 117 ml of pentane at 20° C. for 1 minute. The settling in volume of the catalyst precipitation (in ml) during the recovery and the washings are summarised in Table 2. The reaction product was dried under nitrogen flow at 60° for 50 minutes. The yield was 4.2 g.

TABLE 2

Settling of the reaction product

| Settling time (min) | Recovery Toluene/ heptane | Washings Toluene/1 | Heptane/1 | Heptane/2 | Pentane/1 | Pentane/2 |
|---|---|---|---|---|---|---|
| 0 | 150 | 125 | 175 | 155 | 140 | 130 |
| 1 | 19 | 50 | 20 | 18 | 16 | 14 |
| 2 | 17 | 16 | 15 | 14 | 13 | 13 |

Example 3

The same procedure as in example 1 was used for the preparation of the magnesium complex. The cold solution obtained was siphonated into a solution of 7 mol of titanium tetrachloride at 110° C.

The solution was then heated at 110° C. for 5 minutes and the reaction product was recovered by adding consecutively 74 ml of toluene and 30 ml of heptane at 90° C. and allowing it to settle for 5 minutes.

After the recovering, the reaction product was washed five times: first with 113 ml of toluene at 90° C. for 5 minutes, secondly with 119 ml of heptane at 90° C. for 2 minutes, thirdly with 143 ml of heptane at 90° C. for 2 minutes, fourthly with 120 ml of pentane at 20° C. for 2 minutes and fiftly with 112 ml of pentane at 20° C. for 2 minutes. The settling in volume of the catalyst precipitation (in ml) during the recovery and the washings are summarised in Table 3. The reaction product was dried under nitrogen flow at 60° for 45 minutes. The yield was 4.4 g.

TABLE 3

Settling of the reaction product

| Settling time (min) | Recovery Toluene/ heptane | Washings Toluene/1 | Heptane/1 | Heptane/2 | Pentane/1 | Pentane/2 |
|---|---|---|---|---|---|---|
| 0 | 160 | 160 | 155 | 170 | 138 | 131 |
| 1 | 45 | 35 | 24 | 20 | 22 | 21 |
| 2 | 38 | 28 | 20 | 18 | 19 | 16 |
| 3 | 37 | 25 | | | | |
| 4 | 36 | 24 | | | | |
| 5 | 35 | 23 | | | | |

Comparative Example 4

The same procedure as in example 1 was used for the preparation of the magnesium complex. The solution obtained, at 110° C., was siphonated into a hot solution of 10 mol of titanium tetrachloride.

The solution was then heated at 110° C. for 5 minutes and the reaction product was recovered by adding 111 ml of toluene at 90° C. and allowing it to settle for 30 minutes.

After the recovering, the reaction product was washed four times: first with 160 ml of toluene at 90° C. for 28 minutes, secondly with 160 ml of heptane at 90° C. for 8 minutes, thirdly with 150 ml of heptane at 90° C. for 6 minutes and fourthly with 150 ml of pentane at 20° C. for 6 minutes. The settling in volume of the catalyst precipitation (in ml) during the recovery and the washings are summarised in Table 4. The reaction product was dried under nitrogen flow at 60° for 30 minutes. The yield was 6.6 g.

TABLE 4

Settling of the reaction product

| Settling time (min) | Recovery Toluene | Washings Toluene/1 | Heptane/1 | Heptane/2 | Pentane |
|---|---|---|---|---|---|
| 0 | 175 | 240 | 220 | 200 | 185 |
| 10 | 95 | 80 | 48 | 37 | 36 |
| 20 | 70 | 56 | | | |
| 30 | 65 | 52 | | | |

Chemical Characterisation of the Catalyst Components

The catalyst components were characterised with respect to their chemical composition by measuring their Mg, Ti and Cl content. The Mg and Ti analysis was started by dissolving the samples in a mixture of nitric and hydrofluoric acid. The metal was measured by flame atomic absorption with a nitrous oxide/acetylene flame. Chloride was determined after dissolution in dilute sulphuric acid by potentiometric titration with a standard silver nitrate solution. The results are summarised in Table 5.

The determination of the phatalic esters (DOP) and the phtalic anhydride (PA) were done by first dissolving the sample in acetone. The dissolution was facilitated by keeping the acetone slurry in an ultra-sound bath for 5 minutes. After this the samples were filtered and run by solution chromatography. Each component was identified by comparing the respective retention time and UV spectra with standard conditions.

TABLE 5

Chemical characteristics of the catalyst components

| Catalyst | Example 1 | Example 2 | Example 3 | Comp. ex. 4 |
|---|---|---|---|---|
| Mg (wt-%) | 13.8 | 14.1 | 14.3 | 10.3 |
| Mg/Ti (mol/mol) | 7.0 | 8.4 | 7.0 | 3.3 |
| Ti (wt-%) | 3.9 | 3.3 | 4.0 | 6.2 |
| Ti (mol) | 1.0 | 1.0 | 1.0 | 1.0 |
| Cl (wt-%) | 50.5 | 57.5 | 53.6 | 44.8 |
| DOP (wt-%) | 19.4 | 16.5 | 20.6 | 27.4 |
| DOP/Ti (mol/mol) | 0.6 | 0.6 | 0.6 | 0.5 |
| PA (wt-%) | 0.61 | 0.88 | 0.58 | 0.53 |

Bulk Polymerization of Propene

Propene was polymerised in a stirred tank reactor having a volume of 5 l. About 0.9 ml of triethyl aluminium (TEA) as cocatalyst, about 0.12 ml of a 100-% solution of cyclohexyl dimethoxy silane (CMMS) as an external donor and 30 ml of n-pentane were mixed and allowed to react for 5 minutes. Half of the mixture was added to the polymerisation reactor and the other half was mixed with about 20 mg of catalyst complex, prepared in examples 1–4, respectively. After additional 5 minutes the catalyst/TEA/donor/n-pentane mixture was introduced to the reactor.

The Ti/Al molar ratio was 250 and the Al/external donor molar ratio was 10. 70 mmol of hydrogen and 1400 g of propene were introduced to the reactor and the temperature was risen to 70° C.

The polymerisation time was 60 minutes (at 70° C.), after which the polymer formed was taken out from the reactor and characterised with respect to their melt flow rate ($MFR_2$, in g/10 min), determined according to the standard ISO 1133 (230° C. and 2.16 kg load) and bulk density (BD). Activity (Activ.) is given in g of polypropene (PP) formed per g of catalyst or per g of Ti. The results are summarised in Table 6.

TABLE 6

Polymerisation results

| Catalyst | Example 1 | Example 2 | Example 3 | Comp. ex. 4 |
|---|---|---|---|---|
| Activ. (kgPP/g*cat) | 24.2 | 23.7 | 27.0 | 16.9 |
| Activ. (kgPP/g*Ti) | 61.9 | 718 | 674 | 273 |
| MFR$_2$ | 5.0 | 5.2 | 4.9 | 5.2 |
| BD (kg/m$^3$) | 290 | 446 | 345 | 280 |

What is claimed is:

1. A process for the preparation of a particulate olefin polymerization catalyst component comprising a magnesium dihalide, a titanium tetrahalide and a carboxylic acid ester, comprising the steps of:
   (i) reacting in solution a magnesium compound containing an alkoxy group, a carboxylic acid halide and a tetravalent titanium compound containing a halogen, to obtain a dissolved reaction product, and
   (ii) recovering a fraction of the reaction product from step (i) in particulate form by precipitating the dissolved reaction product with an aromatic hydrocarbon and settling the precipitate by adding an aliphatic hydrocarbon to the precipitated reaction mixture or by precipitating and settling the dissolved reaction product with a mixture of an aliphatic and an aromatic hydrocarbon, the amount of the aromatic and aliphatic hydrocarbon being at least 5 mol per mol of magnesium.

2. The process according to claim 1, wherein in a first step of step (i), the magnesium compound containing an alkoxy group is reacted with the carboxylic acid halide in the presence of a first solvent and in a second step of step (i) the obtained product is further reacted with the tetravalent titanium compound containing a halogen in the presence of a second solvent.

3. The process according to claim 2, wherein the first solvent is an aliphatic $C_5$–$C_{12}$-hydrocarbon.

4. The process according to claim 2, wherein the first solvent is an aromatic hydrocarbon selected from benzenes and alkylated benzenes.

5. The process according to claim 3 or 4, wherein the molar ratio of said first solvent to magnesium is from 4 to 10.

6. The process according to claim 2, wherein the second solvent is an aromatic hydrocarbon selected from benzenes and alkylated benzenes.

7. The process according to claim 6, wherein the molar ratio of said second solvent to magnesium is from 3 to 10.

8. The process according to claim 2, wherein the first and the second solvents are the same aromatic hydrocarbon selected from benzenes and alkylated benzenes.

9. The process according to claim 8, wherein the molar ratio of said solvent to magnesium is from 3 to 10.

10. The process according to claim 2, wherein the first solvent is an aliphatic $C_5$–$C_{12}$-hydrocarbon which is replaced by an aromatic hydrocarbon before the second step.

11. The process according to claim 1, wherein the mixture of an aromatic hydrocarbon and an aliphatic hydrocarbon in step (ii) contains from 95 to 40% by weight of an aromatic hydrocarbon and from 5 to 60% by weight of an aliphatic hydrocarbon.

12. The process according to claim 11, wherein the aromatic hydrocarbon is selected from benzenes and alkylated benzenes.

13. The process according to claim 11 wherein the aliphatic hydrocarbon is an aliphatic $C_5$–$C_{12}$-hydrocarbon.

14. The process according to claim 1, wherein the recovery of a fraction of the reaction product in particulate form is performed by precipitating and settling the dissolved reaction product with 5 to 5000 mol per mol of magnesium of said mixture of an aromatic and an aliphatic hydrocarbon.

15. The process according to claim 1, wherein the recovering of the reaction product in particulate form is performed by precipitating the dissolved reaction product with an aromatic hydrocarbon and settling the precipitate by gradually adding aliphatic hydrocarbon to the precipitated reaction mixture.

16. The process according to claim 15, wherein said dissolved reaction product is precipitated with 40 to 95% by weight of said aromatic hydrocarbon based on the total amount of hydrocarbons added in the recovering step (ii), and wherein said settling of the precipitate is performed by adding from 5 to 60% by weight of said aliphatic hydrocarbon based on the total amount of hydrocarbons added in the recovering step (ii).

17. The process according to claim 1, wherein the recovered fraction of the reaction product which has been recovered in particulate form is washed at least once with a hydrocarbon selected from aromatic and aliphatic hydrocarbons.

18. The process according to claim 1, wherein the magnesium compound containing an alkoxy group is selected from the group consisting of magnesium dialkoxides, complexes of a magnesium dihalide and an alcohol, and complexes of a magnesium dihalide and a magnesium dialkoxide.

19. The process according to claim 1, wherein the magnesium compound containing an alkoxy is a reaction product of an alcohol and a magnesium compound selected from the group consisting of dialkyl magnesiums, alkyl magnesium alkoxides, alkyl magnesium halides and magnesium dihalides.

20. The process according to claim 19, wherein the magnesium compound is a dialkyl magnesium.

21. The process according to claim 19, wherein the magnesium compound is a magnesium dihalide.

22. The process according to claim 18 or 19 wherein the alcohol is selected from the group consisting of polyhydric alcohols and mixtures of monohydric alcohol and polyhydric alcohol.

23. The process according to claim 22, wherein the polyhydric alcohol is a glycol or glycerol.

24. The process according to claim 1, wherein the carboxylic acid halide is a dicarboxylic acid dihalide.

25. The process according to claim 1, wherein the tetravalent titanium compound containing a halogen is a titanium tetrachloride.

26. The process according to claim 1, wherein during the reaction of the magnesium compound containing an alkoxy group and the carboxylic acid halide, a halogenated hydrocarbon is added to the reaction mixture.

27. A particulate olefin polymerization catalyst component comprising a magnesium dihalide, a titanium tetrahalide and a carboxylic acid ester as internal electron donor prepared according to the process of claim 1.

28. A process for the polymerisation of olefins, wherein an olefin is contacted with a particulate olefin polymerization catalyst component comprising a magnesium dihalide, a titanium tetrahalide and a carboxylic acid ester as internal electron donor, and an organometallic cocatalyst, wherein said particulate olefin polymerisation catalyst component has been prepared according to the process of claim 1.

29. The process according to claim 28 wherein the organometallic cocatalyst is an alkyl aluminium chloride.

30. The process according to claim 3 wherein the aliphatic $C_5$–$C_{12}$ hydrocarbon is selected from the group consisting of pentane, hexane, heptane and octane.

31. The process according to claim 4, wherein the aromatic hydrocarbon is selected from the group consisting of benzene, toluene and xylenes.

32. The process according to claim 4, wherein the aromatic hydrocarbon is toluene.

33. The process according to claim 5, wherein the molar ratio is from 5 to 9.

34. The process according to claim 5, wherein the molar ratio is from 6 to 8.

35. The process according to claim 6, wherein the aromatic hydrocarbon is selected from benzene, toluene and xylenes.

36. The process according to claim 6, wherein the aromatic hydrocarbon is toluene.

37. The process according to claim 7, wherein the molar ratio is from 4 to 8.

38. The process according to claim 7, wherein the molar ratio is from 5 to 7.

39. The process according claim 8, wherein the aromatic hydrocarbon is toluene.

40. The process according to claim 11, wherein the mixture of an aromatic hydrocarbon and an aliphatic hydrocarbon in step (ii) contains 90 to 50% by weight of an aromatic hydrocarbon and from 10 to 50% by weight of an aliphatic hydrocarbon.

41. The process according to claim 12, wherein the aromatic hydrocarbon is selected from the group consisting of alkyalted benzenes, toluene and xylenes.

42. The process according to claim 12, wherein the aromatic hydrocarbon is toluene.

43. The process according to claim 13, wherein the aliphatic $C_5$–$C_{12}$ hydrocarbon is selected from the group consisting of pentane, hexane, heptane and octane.

44. The process according to claim 13, wherein the aliphatic $C_5$–$C_{12}$ hydrocarbon is pentane, hexane or heptane.

45. The process according to claim 14, wherein the dissolved reaction product is contacted with 10 to 2000 mol per mol of magnesium of the mixture of an aromatic and an aliphatic hydrocarbon.

46. The process according to claim 14, wherein the dissolved reaction product is contacted with 20 to 100 mol per mol of magnesium of the mixture of an aromatic and an aliphatic hydrocarbon.

47. The process according to claim 16, wherein the dissolved reaction product is precipitated with 50 to 90% by weight of said aromatic hydrocarbon based on the total amount of hydrocarbon added in the recovering step (ii) and wherein said settling of the precipitate is performed by adding from 10 to 50% by weight of said aliphatic hydrocarbon based on the total amount of hydrocarbons added in the recovering step (ii).

48. The process according to claim 17, wherein the recovered fraction is washed at least twice or at least three times with a hydrocarbon.

49. The process according to claim 20, wherein the dialkyl magnesium compound is a di-$C_4$–$C_{10}$ alkyl magnesium.

50. The process according to claim 21, wherein the magnesium dihalide is magnesium dichloride.

51. The process according to claim 23, wherein the polyhydric alcohol is ethylene glycol, 2-butyl-2-ethyl-1,3-propanediol or glycerol.

52. The process according to claim 47, wherein the carboxylic acid halide is phthalic acid dichloride.

* * * * *